United States Patent
Fontaine et al.

(10) Patent No.: US 10,656,359 B2
(45) Date of Patent: May 19, 2020

(54) FIBER OPTIC CASSETTE SYSTEM WITH SLANTABLE CONNECTOR

(71) Applicant: BELDEN CANADA INC., Saint-Laurent (CA)

(72) Inventors: Marc Fontaine, Les Cèdres (CA); Christian Roa-Quispe, Laval (CA)

(73) Assignee: BELDEN CANADA INC. (CA)

( * ) Notice: Subject to any disclaimer, the term of this patent is extended or adjusted under 35 U.S.C. 154(b) by 0 days.

(21) Appl. No.: 16/201,235

(22) Filed: Nov. 27, 2018

(65) Prior Publication Data

US 2019/0162924 A1 May 30, 2019

Related U.S. Application Data

(60) Provisional application No. 62/592,473, filed on Nov. 30, 2017.

(51) Int. Cl.
*G02B 6/00* (2006.01)
*G02B 6/44* (2006.01)
*G02B 6/38* (2006.01)

(52) U.S. Cl.
CPC ......... *G02B 6/4455* (2013.01); *G02B 6/3825* (2013.01); *G02B 6/3897* (2013.01); *G02B 6/4452* (2013.01); *G02B 6/4453* (2013.01)

(58) Field of Classification Search
CPC .. G02B 6/4455; G02B 6/4452; G02B 6/4453; G02B 6/3897; G02B 6/3825
See application file for complete search history.

(56) References Cited

U.S. PATENT DOCUMENTS

| | | | | |
|---|---|---|---|---|
| 9,279,951 | B2* | 3/2016 | McGranahan | G02B 6/4453 |
| 9,389,384 | B2* | 7/2016 | Solheid | G02B 6/4452 |
| 2005/0112939 | A1* | 5/2005 | Grzegorzewska | G02B 6/3825 439/534 |
| 2010/0074578 | A1* | 3/2010 | Imaizumi | G02B 6/4446 385/24 |
| 2010/0322580 | A1* | 12/2010 | Beamon | G02B 6/4452 385/135 |
| 2014/0037259 | A1* | 2/2014 | Bragg | H01R 13/659 385/135 |
| 2017/0010432 | A1* | 1/2017 | Xu | G02B 6/4452 |

* cited by examiner

*Primary Examiner* — Ellen E Kim
(74) *Attorney, Agent, or Firm* — Lavery, De Billy, LLP; Hugh Mansfield

(57) ABSTRACT

A fiber optic cassette and system is disclosed. The cassette is mountable on a tray in parallel to and adjacent to at least one other like cassette. Each cassette comprises an housing having an axis, a first optic fiber connector-receiving receptacle along a housing front face for receiving at least one first optic fiber, a second optic fiber connector-receiving receptacle along a housing rear face for receiving at least one second optic fiber, and at least one third optic fiber within the housing, the third optic fibers interconnecting respective ones of the first optic fibers and the second optic fibers. The rear optic fiber connector-receiving receptacle is moveable in a horizontal plane between a first position wherein the rear receptacle is arranged at a first angle to the axis and a second position wherein the rear receptacle is arranged at a second angle to the axis.

20 Claims, 11 Drawing Sheets

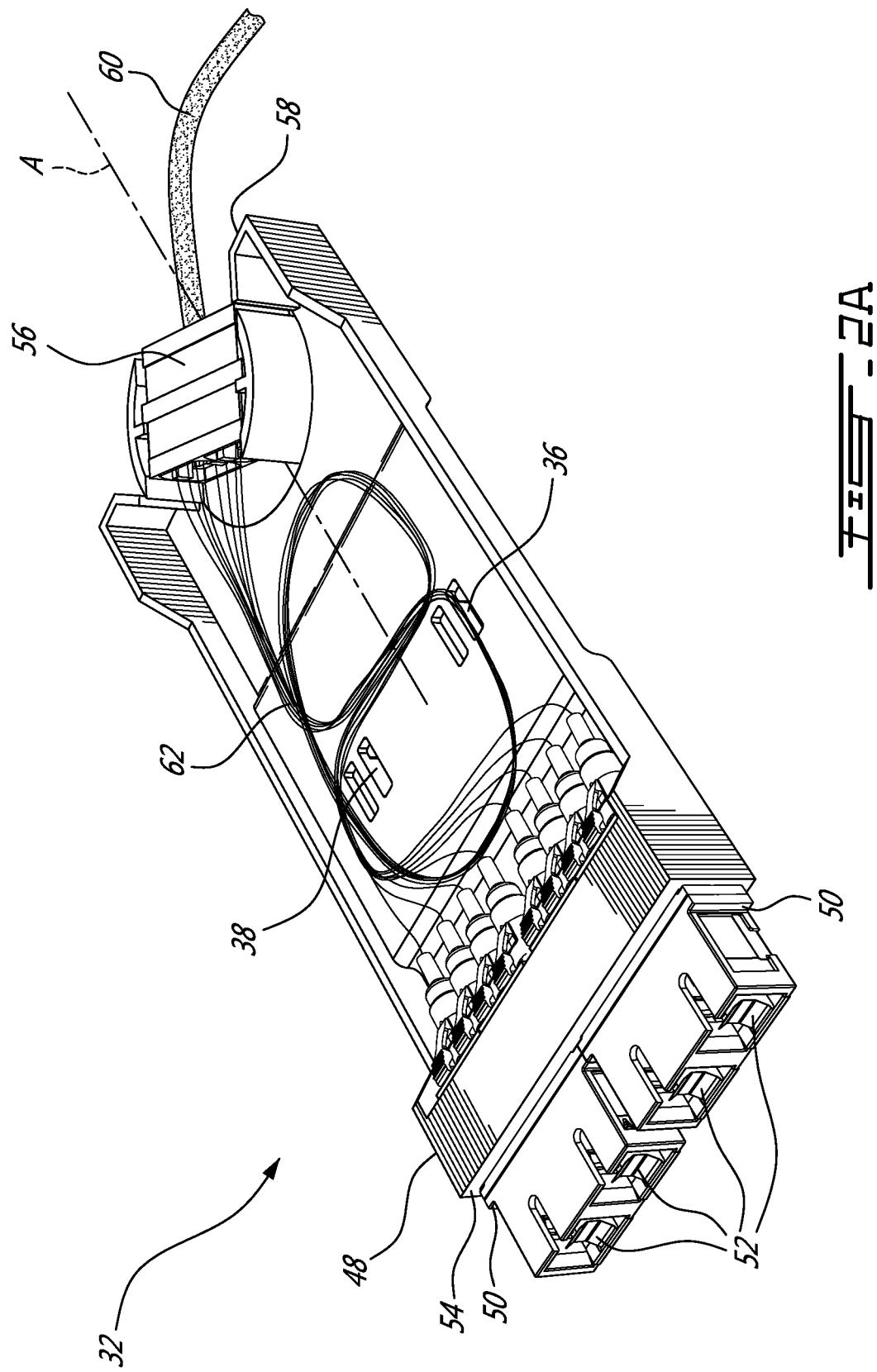

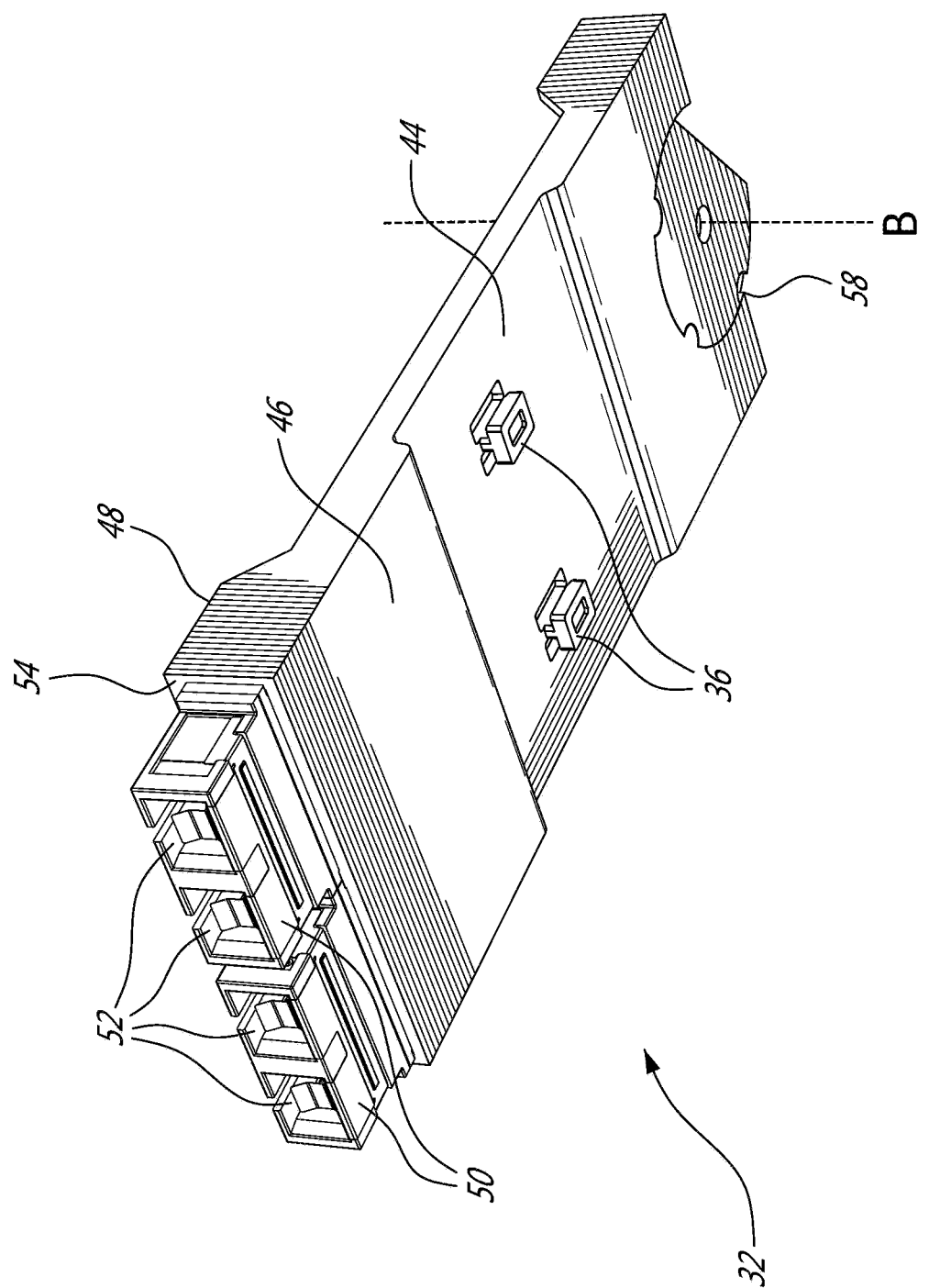

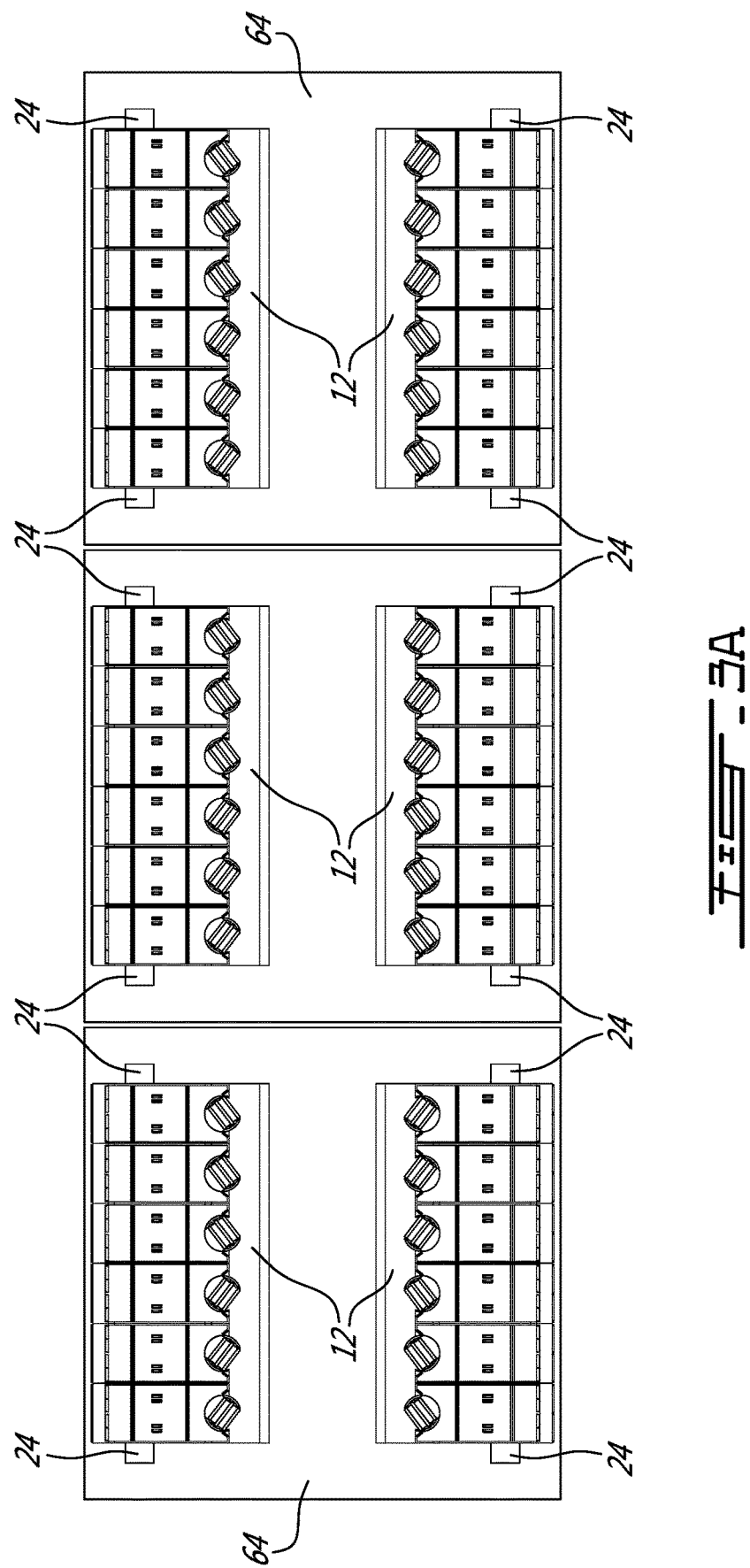

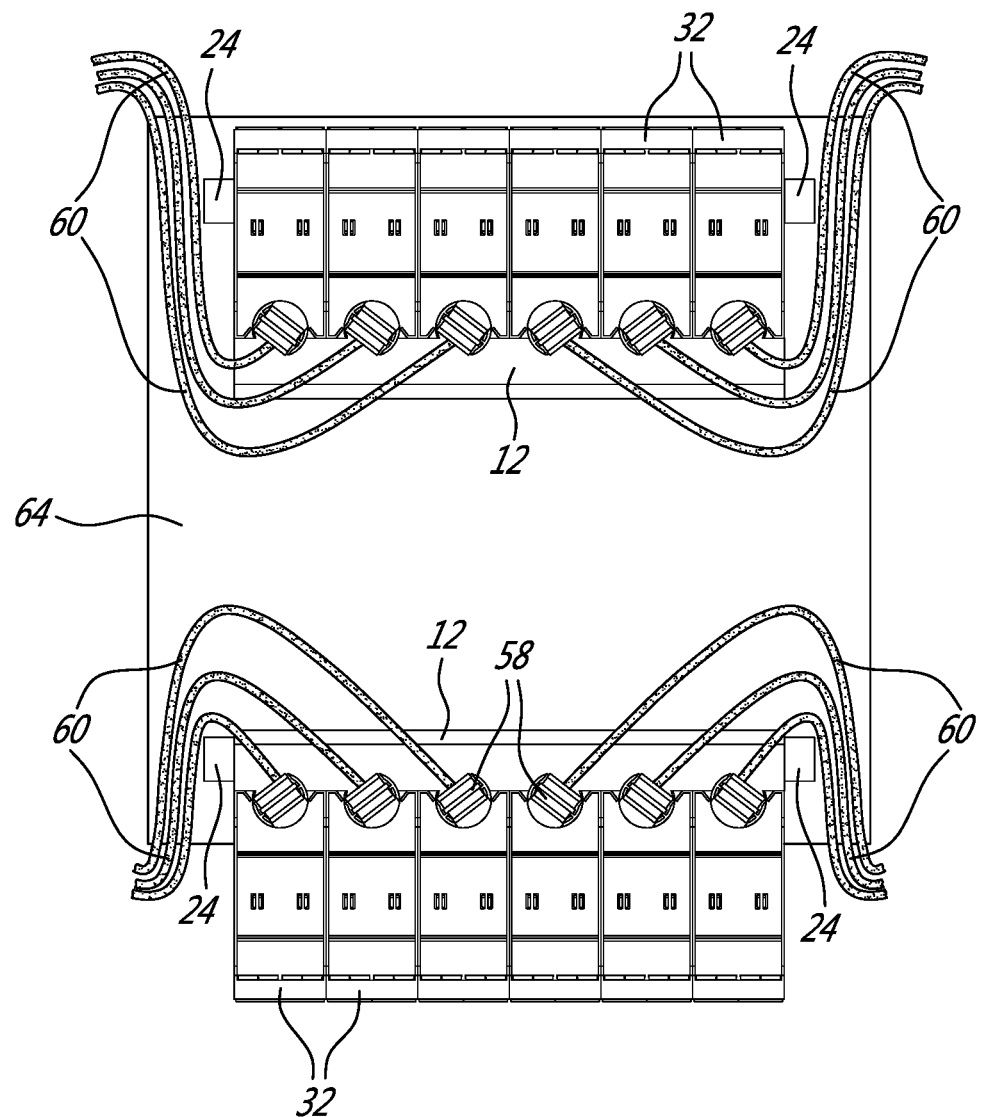

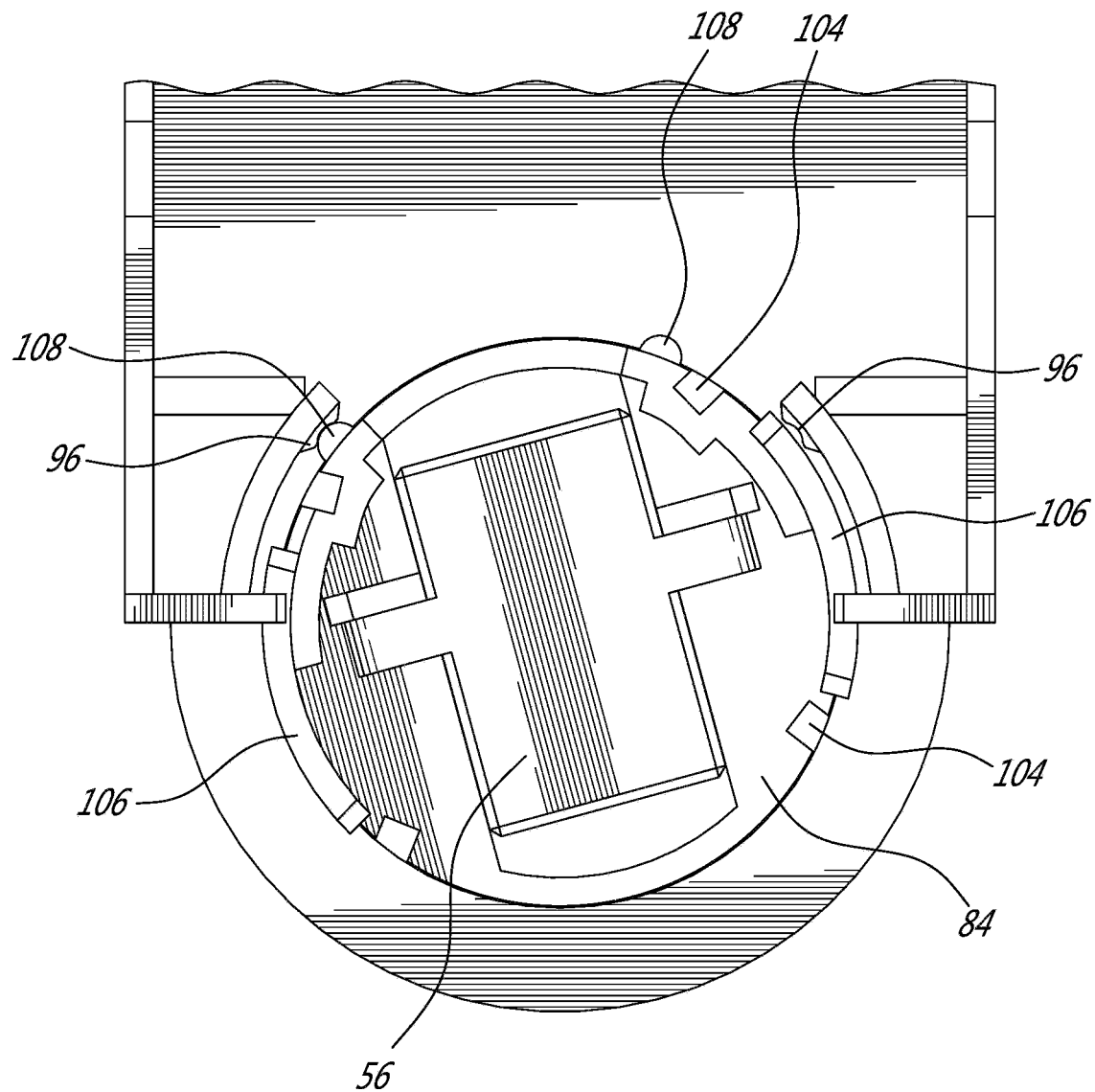

ptic cas-
FIBER OPTIC CASSETTE SYSTEM WITH SLANTABLE CONNECTOR

CROSS REFERENCE TO RELATED APPLICATIONS

This application claims benefit under 35 U.S.C. § 119(e) of U.S. provisional application Ser. No. 62/592,473 filed on Nov. 30, 2017 which is incorporated herein in its entirety by reference.

FIELD OF THE INVENTION

The present invention relates to a fiber optic cassette system with a slantable connector. In particular, the present invention relates to fiber optic cassettes comprising a fiber connector-receiving receptacle moveable in a horizontal plane such that bending stress on fiber optic cables terminated at the cassette may be reduced.

BACKGROUND TO THE INVENTION

The prior art discloses fiber optic cassettes or splice boxes for use in terminating fiber optic trunk cables and splitting them out to patch cables which are removably arranged on tray systems within a rack mounted case. One drawback of these cassettes and tray systems is that close attention must be paid to the minimum bend radius of fiber optic cables. Often quantified as being roughly ten times the diameter of the cable, the minimum bend radius must be respected in order to avoid damaging the cable. In addition to mechanical damage to the cable, microbending of the cable may lead to light attenuation induced by deformation of the fiber, and macrobending may lead to leakage of light through the fiber cladding. Another drawback is that racks in data centres are often placed back to back in predetermined spaces, often square tiles, thus leading to spatial constraints.

The prior art further discloses fiber optic cassettes with angled connectors in order to comply with the cable's minimum bend radius and respect spatial constraints. However, these connectors are fixed at a given angle, and thus cannot be modified by a user when a different direction is desired.

SUMMARY OF THE INVENTION

In order to address the above and other drawbacks, there is provided a fiber optic cassette mountable on a tray in parallel to and adjacent to at least one other like cassette, the cassette for interconnecting a terminated end of at least one first optic fiber and a terminated end of at least one second optic fiber. The cassette comprises an elongate cassette housing having an axis, a first optic fiber connector-receiving receptacle arranged along a cassette housing front face for receiving the terminated end of the at least one first optic fiber, a second optic fiber connector-receiving receptacle arranged along a cassette housing rear face for receiving the terminated end of the at least one second optic fiber, and at least one third optic fiber within the housing, each of the at least one third optic fiber for interconnecting the terminated ends of respective ones of the at least one first optic fiber and the at least one second optic fiber. The rear optic fiber connector-receiving receptacle is moveable in a horizontal plane between a first position wherein the rear receptacle is arranged at a first angle to the axis and a second position wherein the rear receptacle is arranged at a second angle to the axis.

There is also provided a rack mountable fiber optic cassette system for interconnecting a first plurality of optic fibers with a second plurality of optic fibers. The system comprises a case comprising a top and a bottom wall and two opposed sidewalls, each of the sidewalls attached between respective side edges of the top and bottom wall, the walls together defining a tray receiving space therebetween and a forward edge of each the wall together defining an opening to the tray receiving space, at least one tray slideably received within the tray receiving space for movement between a stored position wherein the tray is completely inside the tray receiving space and an accessible position wherein a front end of the tray is in front of the opening and outside of the tray receiving space, the tray having a width dimensioned to receive a plurality of standard width cassettes side by side, and a plurality of like elongate cassettes arrangeable in parallel side by side on the tray, each of the cassettes comprising a housing, at least one front optic fiber connector-receiving receptacle arranged along a housing front face for receiving a terminated end of at least one of the first plurality of optic fibers, at least one rear optic fiber connector-receiving receptacle arranged along a housing rear face for receiving a terminated end of at least one of the second plurality of optic fibers and a third plurality of optic fibers in the housing between the at least one front optic fiber connector-receiving receptacle and the at least one rear optic fiber connector-receiving receptacle, the third plurality of optic fibers for interconnecting the terminated end of the at least one of the first plurality of optic fibers with the terminated end of the at least one of the second plurality of optic fibers, wherein the rear optic fiber connector-receiving receptacle is moveable in a horizontal plane between a first position wherein the rear receptacle is arranged at a first angle to a cassette axis and a second position wherein the rear receptacle is arranged at a second angle to the cassette axis.

BRIEF DESCRIPTION OF THE DRAWINGS

FIGS. 2A and 2B provide respectively a raised right front perspective view and a lowered right front perspective view of a fiber optic cassette system with slantable connector, in accordance with an illustrative embodiment of the present invention;

FIGS. 3A and 3B provide a plan view of fiber optic cassette systems in a data centre, in accordance with an illustrative embodiment of the present invention;

FIG. 6E provides a partial top plan view of a fiber optic cassette and rotating receptacle-receiving disk in accordance with the alternative embodiment of FIGS. 6A and 6B.

DETAILED DESCRIPTION OF THE ILLUSTRATIVE EMBODIMENTS

Figure 1:
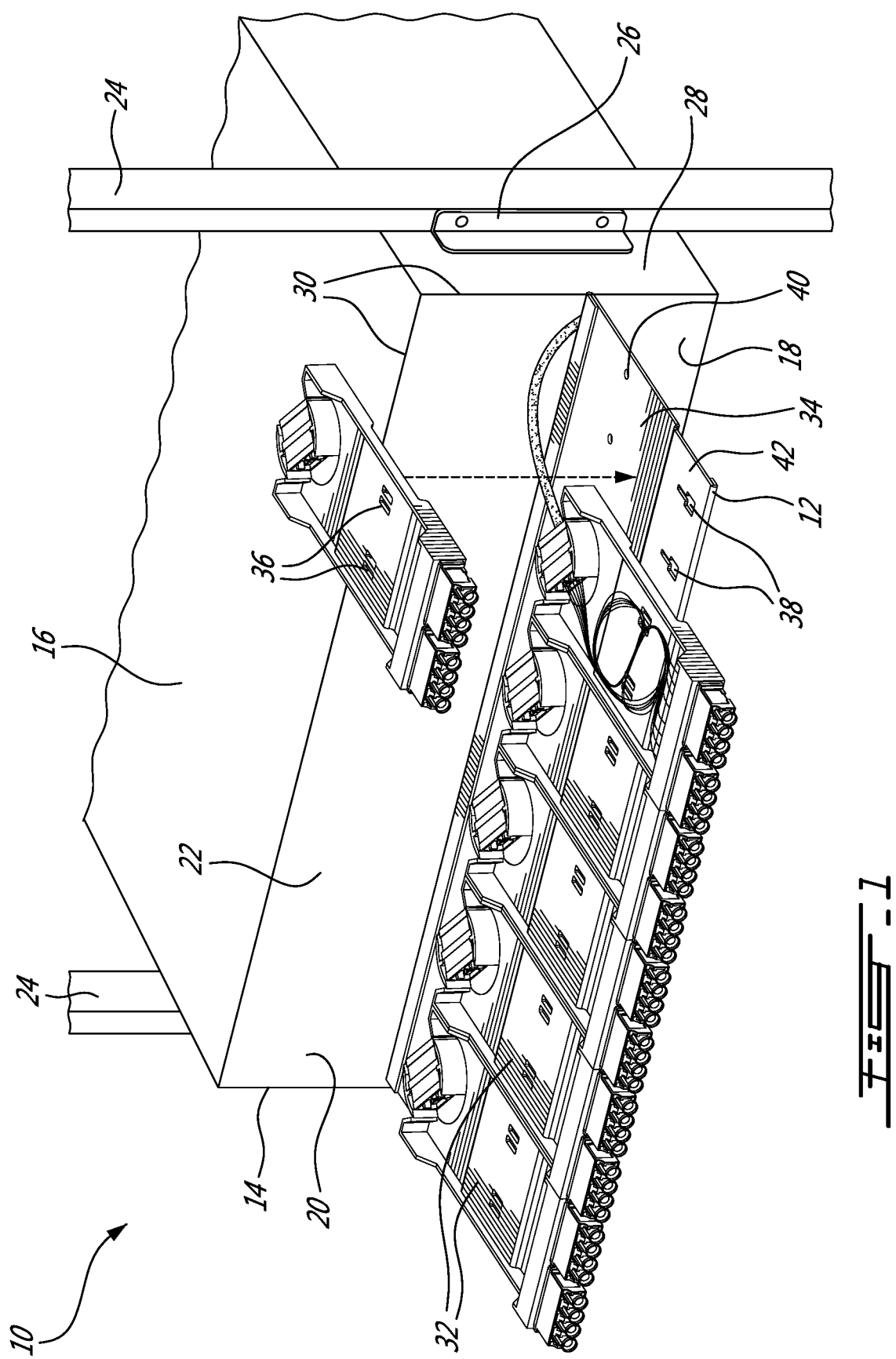
FIG. 1 provides a right front perspective view of a fiber optic cassette system with slantable connector mounted in a rack, in accordance with an illustrative embodiment of the present invention.

Referring now to FIG. 1, a fiber optic cassette system with slantable connector for interconnecting a first plurality of optic fibers with a second plurality of optic fibers, generally referred to using the reference numeral 10, will now be described. The system 10 comprises a slideable tray 12 illustratively mounted within a case 14. The case 14 comprises a top wall 16, a bottom wall 18 and a pair of opposed side walls 20 defining a tray receiving space 22 therebetween. The case 14 is illustratively mounted to the rails 24 of a rack via a pair of mounting brackets 26 wherein one of the brackets 26 is attached to an outer surface 28 of a respective one of the sidewalls 20. The front edges 30 of the walls 16, 18, 20 define an opening via which the tray receiving space 22 can be accessed.

Referring to FIGS. 2A and 2B in addition to FIG. 1, the tray 12 receives a plurality of removable elongate fiber optic modules or cassettes 32 arranged in parallel and adjacent one another side by side on an upper surface 34 thereof. In an embodiment, each fiber optic cassette 32 is secured to the tray 12 using a fastener comprising tabs 36 of inverted "T" cross section which engage with respective slots 38 machined or otherwise formed in the tray 12. A flexible tab (not shown) may also be provided which comprises a boss (not shown) that engages a respective aperture 40 machined or otherwise formed in the tray 12 when the tabs 36 are engaged within their respective slots 38, thereby releasably securing the cassette 32 to the tray 12. In order to better orient the cassette 36 on the tray during installation, the tray 12 comprises a raised shoulder 42 which is received within a channel 44 moulded or otherwise formed in the underside 46 of the cassette 32. A person of ordinary skill in the art would now understand that cassettes 32 typically comprise a snap-type or otherwise releasable or removable covering (not shown).

Still referring to FIGS. 2A and 2B, each cassette 32 illustratively comprises a housing 48 and at least one first or front receptacle module 50 each comprising at least one front optic fiber connector-receiving receptacle 52 arranged in a row and exposed along a front face 54 of the cassette housing 48 for receiving a terminated end of at least one of the first plurality of optic fibers (not shown). Each cassette further comprises at least one second or rear optic fiber connector-receiving receptacle 56 arranged along a rear face 58 of the cassette housing 48 for receiving a terminated end of at least one of the second plurality of optic fibers 60. A third plurality of optic fibers 62 between the at least one front receptacle 52 and the at least one rear receptacle 56 interconnects the terminated end of the at least one of the first plurality of optic fibers with the terminated end of the at least one of the second plurality of optic fibers 60. The third plurality of optic fibers 62, which are typically longer than the distance between the front face 54 and the rear face 58, are typically looped several times within the cassette housing 48, for example in a serpentine or the like. A person of ordinary skill in the art will now understand that an optic fiber terminated with a plug (not shown) inserted into a selected at least one front receptacle 52 will interconnect the optic fiber with the third plurality of optic fibers 62. As will be discussed in further detail below, rear face 58 is movable between a first position wherein the at least one rear receptacle 56 is positioned at a first angle to a cassette axis A and a second position wherein the rear receptacle is positioned at a second angle to the cassette axis A.

Referring now to FIG. 3A, in typical data centre, racks 24 supporting a plurality of cassette-holding trays 12 are in some cases placed back to back on individual tiles 64 in order to maximize spatial efficiency. Illustratively, two 19" racks may be placed back to back on a single 24" by 24" square tile. Referring now to FIG. 3B in addition to FIG. 1, two trays 12 are shown back to back in respective racks 24 sitting on tile 64. Trays 12 are illustratively shown in both retracted and extended positions. Rear faces 58 of each cassette 32 are movable to either one of the above-mentioned first or second positions in order to minimize the bend angles of optic fibers 60 and to minimize the space needed by each tray 12. A person of ordinary skill in the art will now understand that the rear face 58 of each cassette 32 can be accessed by sliding tray 12 out of a respective case 14. Further, a person of ordinary skill in the art will now understand that each rear face 58 may be moved to the above mentioned first or second positions depending on the desired direction of the corresponding optic fibers 60.

Figure 4A:
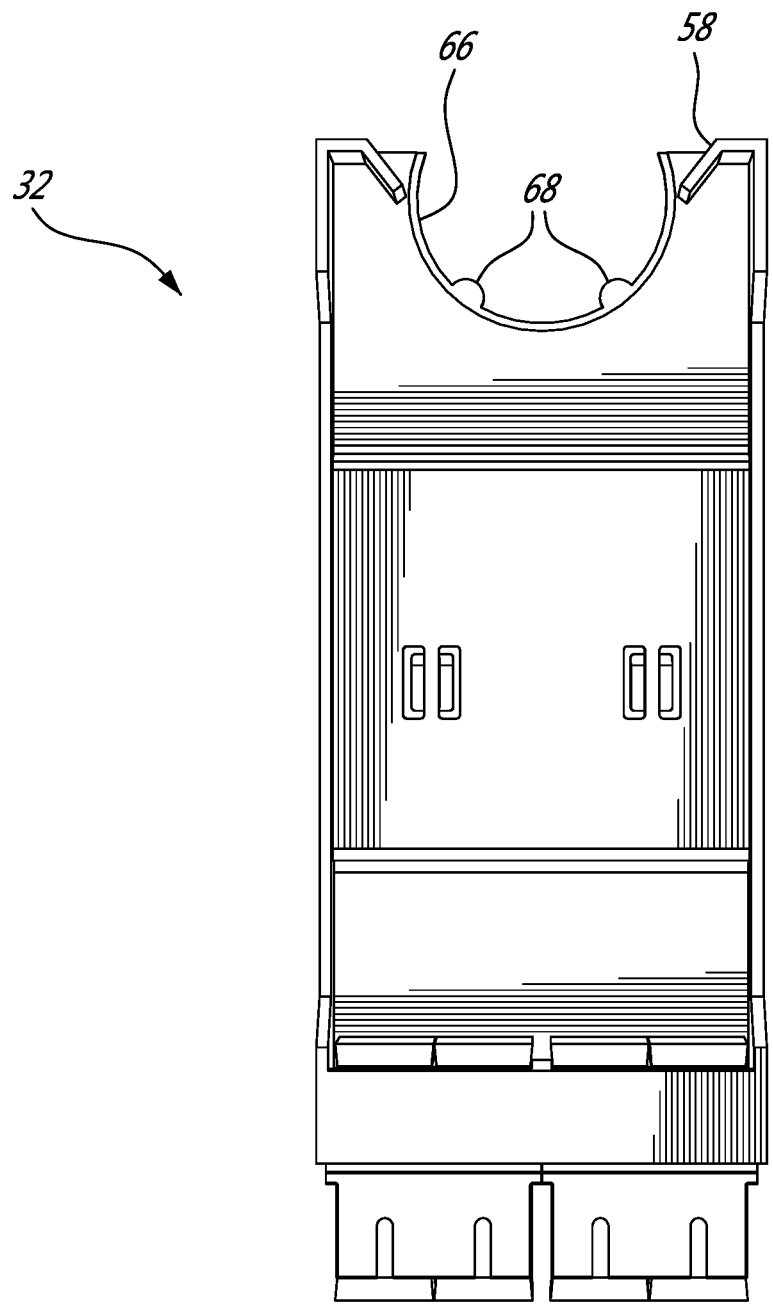
FIGS. 4A and 4B provide top views of an empty elongate fiber optic cassette with and without an attached receptacle, in accordance with a illustrative embodiment of the present invention.
Figure 4B:
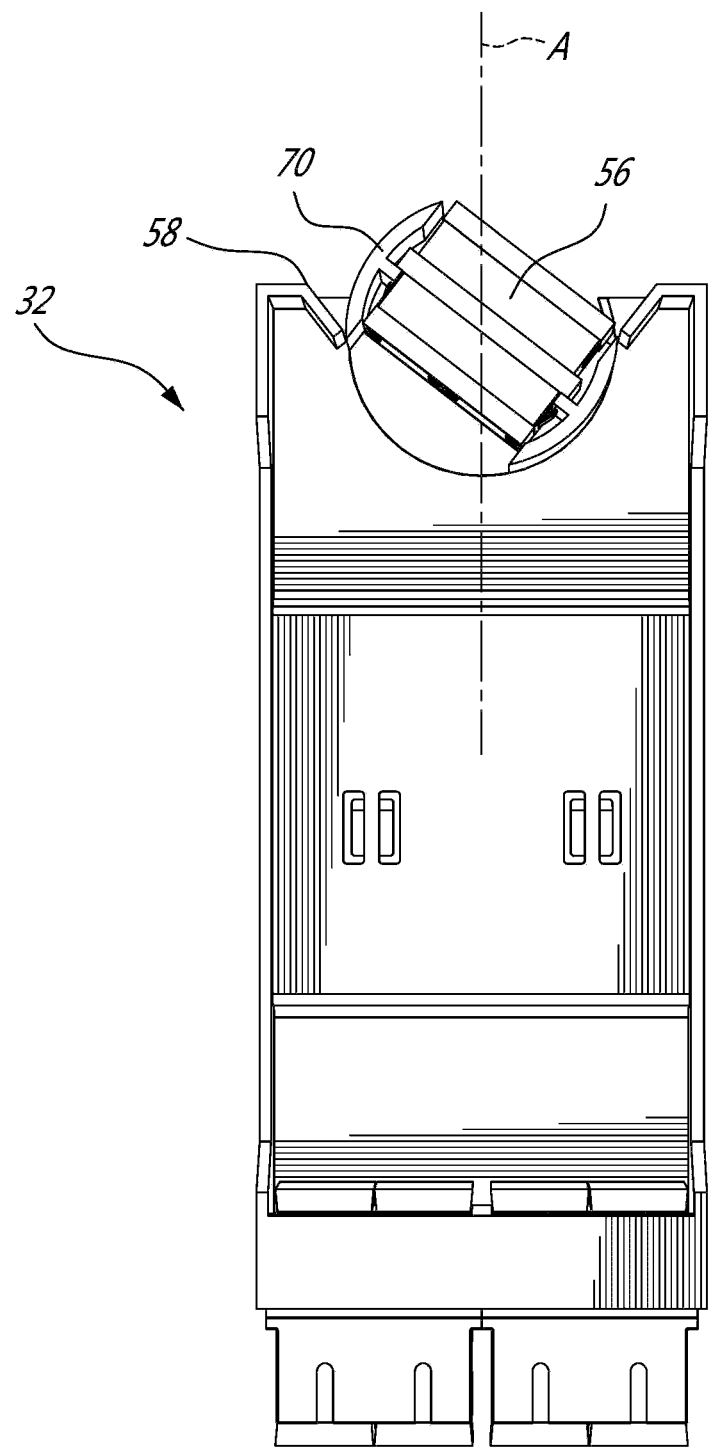
Figure 5A:
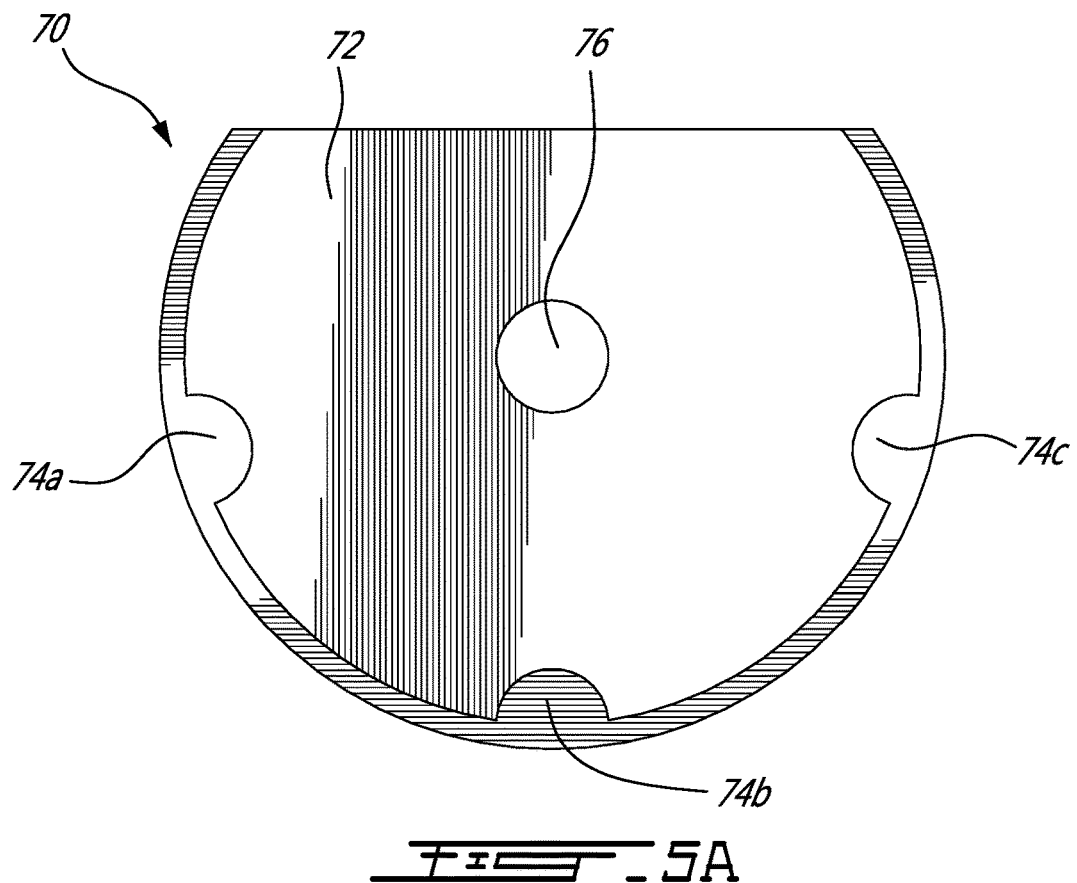
FIGS. 5A and 5B provide respectively a bottom view and a top view of a rotating receptacle-receiving disk for a fiber optic cassette system, in accordance with an illustrative embodiment of the present invention.

Referring now to FIGS. 4A, 4B and 5A in addition to FIGS. 2A and 2B, in a first illustrative embodiment, the rear face 58 of each cassette 32 comprises a cutout section 66 at the rear of comprising a pair of tabs 68 for receiving a rotating receptacle-receiving disk 68 about a vertical axis B. A person of ordinary skill in the art will now understand that while a disk generally refers to a flat, circular plate, it does not necessarily form a perfect circle. Rather, it may be semi-circular and joined by a chord, as does rotating receptacle-receiving disk 70. A lower surface 72 of rotating receptacle-receiving disk 70 comprises a plurality of indentations 74 that engage with tabs 68. In an illustrative embodiment, cutout 66 may comprise two semi-circular tabs 68, and rotating receptacle-receiving disk 70 may comprise three semi-circular indentations 74. A person of ordinary skill in the art will thus now understand that a first position of the rear face 58 is achievable by slanting disk 70 at an angle to cassette axis A such that left indentation 74a and centre indentation 74b engage with tabs 68, and that a second position of the rear face 56 is achievable by slanting disk 70 at an angle to cassette axis A such that center indentation 74b and right indentation 74c engage with tabs 68. In an alternate embodiment, each rotating receptacle-receiving disk 70 comprises a circular cutout 76 at its centre for rotating about a pin (not shown) which defines the vertical axis B on each cassette 32.

Figure 5B:
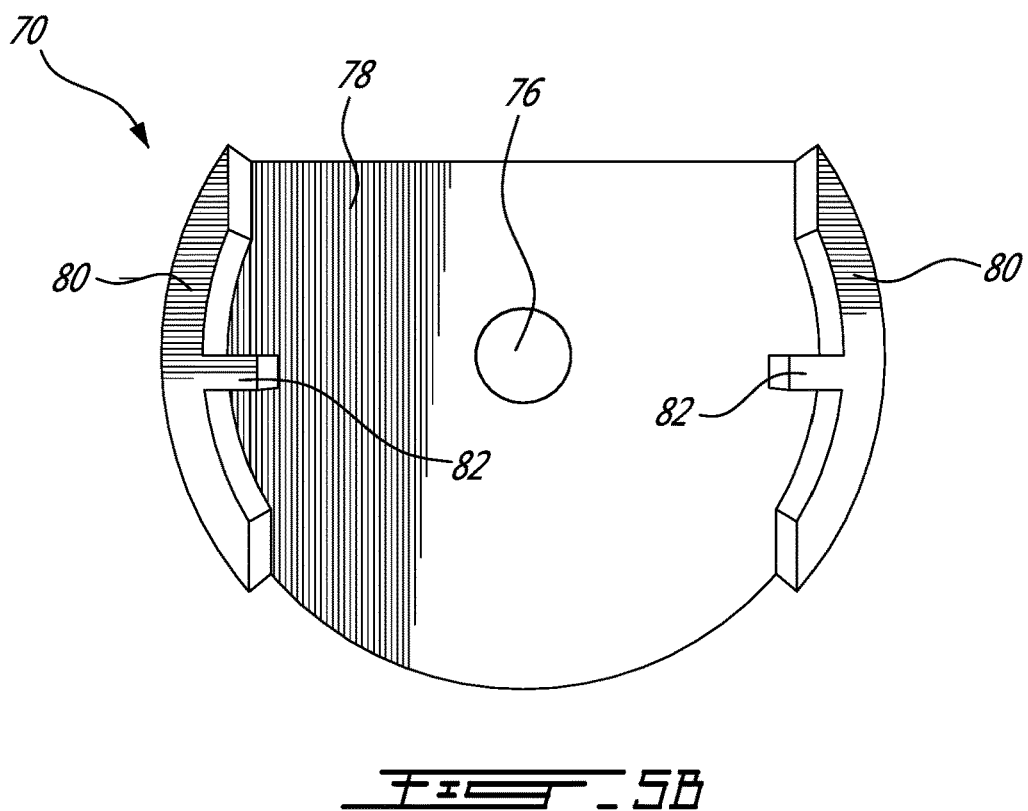

Referring FIG. 5B in addition to FIGS. 4A, 4B and 5A, an upper surface 78 of rotating receptacle-receiving disk 70 comprises a pair of opposed upper surface side walls 80, each side wall 80 comprising a tab 82 for receiving a receptacle 83 for connecting the third plurality of optic fibers 62 to the second plurality of optic fibers 60. Illustratively, the receptacle is a MPO duplex adapter. A person of ordinary skill in the art will now understand that by positioning the rotating receptacle-receiving disk 70 at either the first or second above-mentioned angles to cassette axis A, the second plurality of optic fibers 60 experience less strenuous bend angles and provide for a more efficient use of space.

Figure 6A:
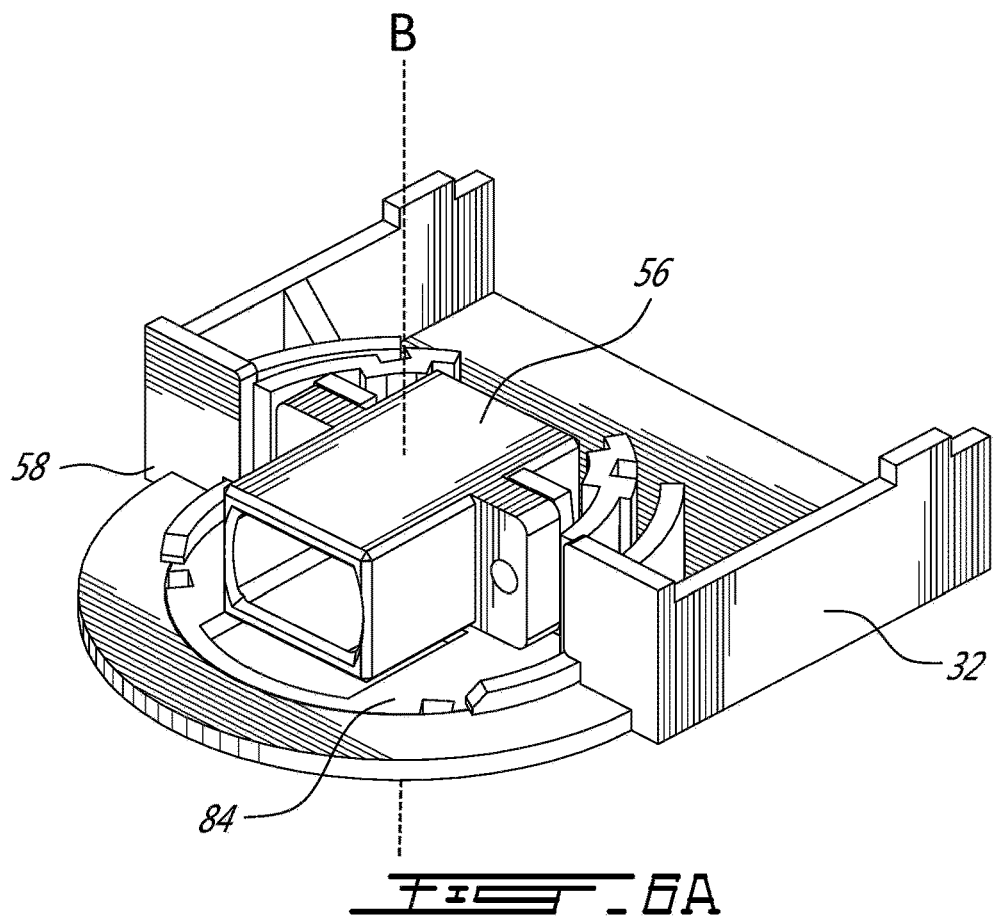
FIGS. 6A and 6B provide raised front right perspective views of an alternative embodiment of a fiber optic cassette system with slantable connector.
Figure 6B:
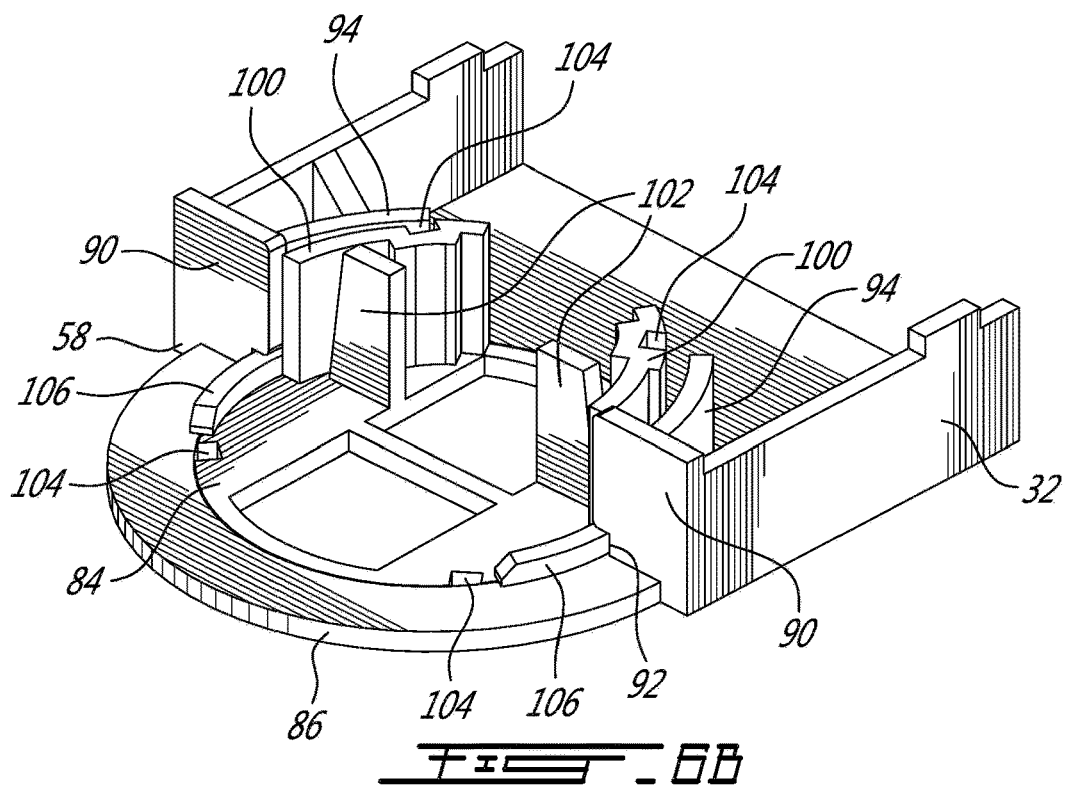
Figure 6C:
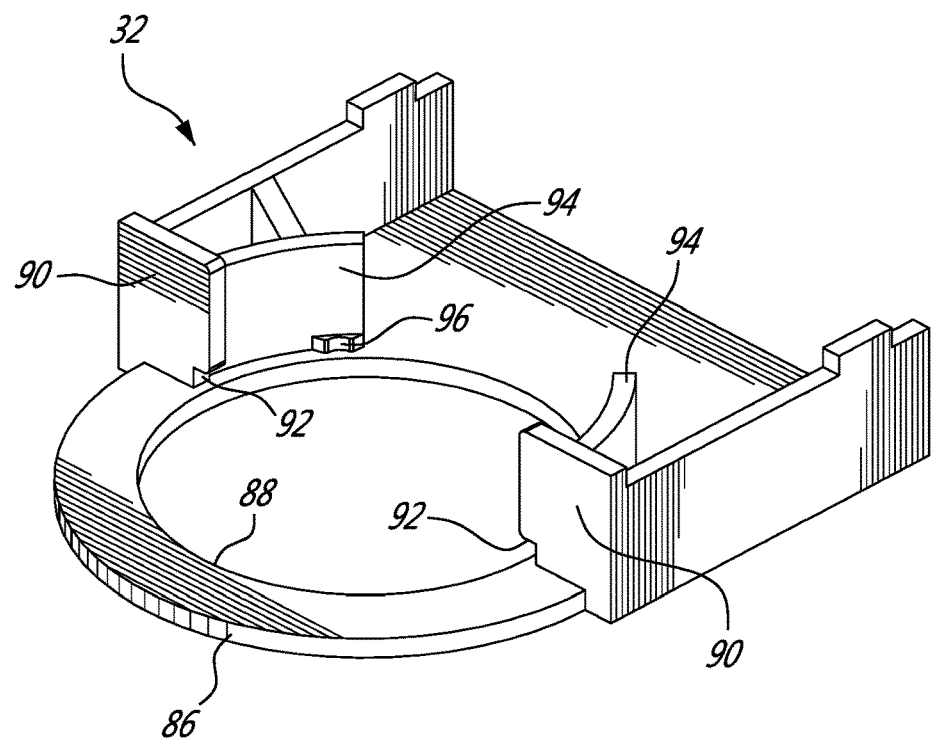
FIG. 6C provides the rear portion of a fiber optic cassette in accordance with the alternative embodiment of FIGS. 6A and 6B.

Referring now to FIGS. 6A and 6B, a second illustrative embodiment of a rear face 58 of a fiber optic cassette 32 comprising a rotating receptacle-receiving disk 84 for receiving the rear optic fiber connector-receiving receptacle 56, illustratively a single MPO adapter, is shown. Referring additionally to FIG. 6C, rear face 58 comprises a semi-circular shaped end piece 86 and a circular cutout 88 for housing the rotating receptacle-receiving disk 70. The rear of cassette 32 comprises inwardly-directed tabs 90 with cutouts 92, illustratively rectangular cutouts, to allow for the rotation of the rotating receptacle-receiving disk 70 about the vertical axis B. The rear of cassette 32 further comprises radially-directed tabs 94 with protrusions 96 which, as will be discussed in more detail below, guide the rotation of the rotating receptacle-receiving disk 84 within the circular cutout 88.

Figure 6D:
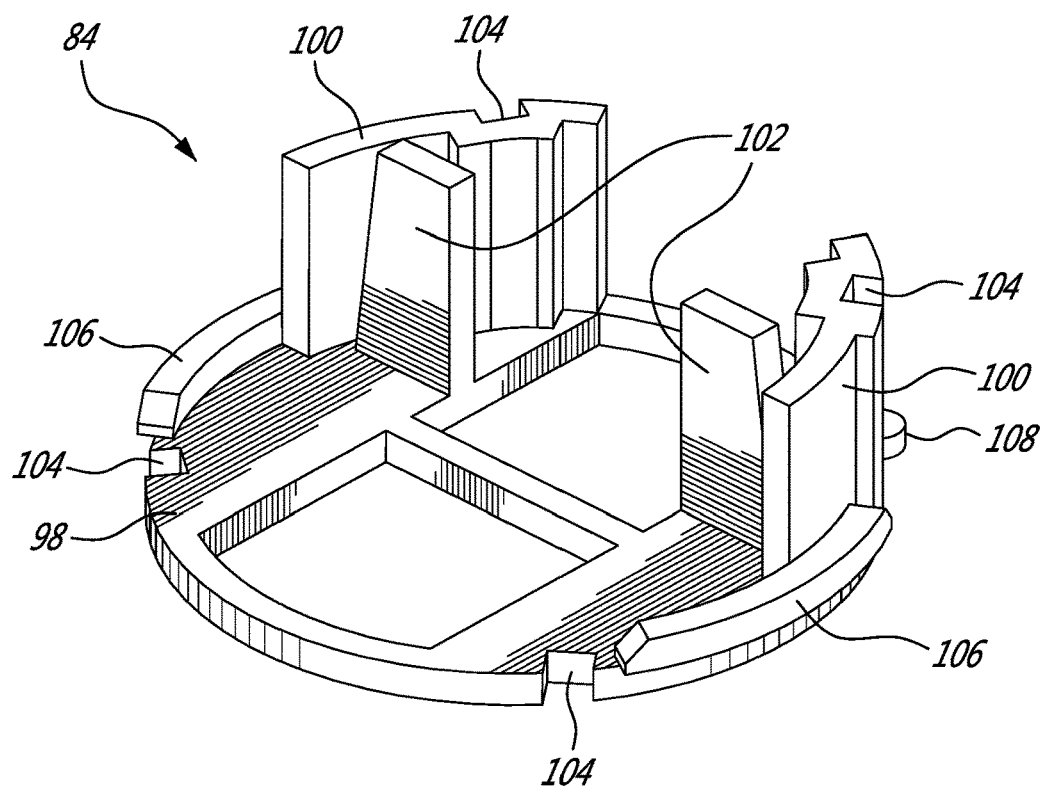
FIG. 6D provides a raised front right perspective view of a rotating receptacle-receiving disk in accordance with the alternative embodiment of FIGS. 6A and 6B.

Referring additionally to FIGS. 6D and 6E, rotating receptacle-receiving disk 84 comprises an upper surface 98 comprising upper surface side walls 100 and tabs 102 for receiving the receptacle 56. Rotating receptacle-receiving disk 84 is insertable into the semi-circular shaped end piece 86 of cassette 32 by sliding notches 104 in sidewalls 100 into inwardly-directed tabs 90. Once inserted, ridges 106 on upper surface 98 allow rotating receptacle-receiving disk 84 to rotate within circular cutout 88. Further, as discussed above each of the pair of protrusions 96 is positioned on a corresponding sidewall 100 and are rotatably engageable with inwardly-directed bosses 108. As such, a first position of the receptacle 56 is defined by a first angle at which a first boss 108 is engaged by a corresponding first protrusion 96, and a second position is defined by a second angle at which a second boss 108 engages with a corresponding second protrusion 96.

Although the present invention has been described hereinabove by way of specific embodiments thereof, it can be modified, without departing from the spirit and nature of the subject invention as defined in the appended claims.

The invention claimed is:

1. A fiber optic cassette mountable on a tray in parallel to and adjacent to at least one other like cassette, the fiber optic cassette for interconnecting a terminated end of at least one first optic fiber and a terminated end of at least one second optic fiber, the cassette comprising:
    an elongate cassette housing having a cassette axis;
    a first optic fiber connector-receiving receptacle arranged along a front face of said elongate cassette housing for receiving the terminated end of the at least one first optic fiber;
    a second optic fiber connector-receiving receptacle arranged about a vertical axis and along a rear face of said elongate cassette housing for receiving the terminated end of the at least one second optic fiber; and
    at least one third optic fiber within said elongate cassette housing, each of said at least one third optic fiber for interconnecting the terminated ends of respective ones of the at least one first optic fiber and the at least one second optic fiber;
wherein said second optic fiber connector-receiving receptacle is rotatable about said vertical axis relative to said elongate cassette housing between a first position wherein said second optic fiber connector-receiving receptacle is arranged at a first angle to said axis and a second position wherein said second optic fiber connector-receiving receptacle is arranged at a second angle to said axis.

2. The fiber optic cassette of claim 1, wherein said first position is to a first side of said axis and said second position is to a second side of said axis opposite said first side.

3. The fiber optic cassette of claim 2, wherein said first angle and said second angle are substantially equal.

4. The fiber optic cassette of claim 2, wherein said first angle and said second angle are between 10 degrees and 45 degrees.

5. The fiber optic cassette of claim 1, wherein said second optic fiber connector-receiving receptacle comprises a circular platform and said elongate cassette housing comprises a circular platform receiving cut-out therein.

6. The fiber optic cassette of claim 5, wherein said second optic fiber connector-receiving receptacle comprises a platform, said elongate cassette housing defines a platform receiving cut-out therein and wherein said platform is received in said cut-out.

7. The fiber optic cassette of claim 5, wherein said circular platform receiving cut-out comprises an open ended major segment of a circle, and wherein said circular platform is rotatable within said circular platform receiving cut-out.

8. The fiber optic cassette of claim 7, further comprising a means for securing said circular platform in a selected one of said first position and said second position.

9. The fiber optic cassette of claim 5, wherein said cut-out comprises a circular aperture and wherein said circular platform is rotatable within said circular aperture.

10. The fiber optic cassette of claim 9, further comprising a means for securing said circular platform in a selected one of said first position and said second position.

11. A rack mountable fiber optic cassette system for interconnecting a first plurality of optic fibers with a second plurality of optic fibers, the system comprising:
    a case comprising a top and a bottom wall and two opposed sidewalls, each of said sidewalls attached between respective side edges of said top and bottom wall, said top and bottom walls and said two opposed sidewalls together defining a tray receiving space therebetween and a forward edge of each said wall together defining an opening to said tray receiving space;
    at least one tray slideably received within said tray receiving space for movement between a stored position wherein said tray is completely inside said tray receiving space and an accessible position wherein a front end of said tray is in front of said opening and outside of said tray receiving space, said tray having a width dimensioned to receive a plurality of standard width cassettes side by side; and
    a plurality of like elongate cassettes arrangeable in parallel side by side on said tray, each of said like elongate cassettes comprising a housing, at least one front optic fiber connector-receiving receptacle arranged along a housing front face for receiving a terminated end of at least one of the first plurality of optic fibers, at least one rear optic fiber connector-receiving receptacle arranged along a housing rear face for receiving a terminated end of at least one of the second plurality of optic fibers and a third plurality of optic fibers in said housing between said at least one front optic fiber connector-receiving receptacle and said at least one rear optic fiber connector-receiving receptacle, said third plurality of optic fibers for interconnecting the terminated end of the at least one of the first plurality of optic fibers with the terminated end of the at least one of the second plurality of optic fibers, wherein each of said rear optic fiber connector-receiving receptacle is rotatable in a horizontal plane relative to a respective elongate cassette housing about a respective vertical axis between a first position wherein said rear receptacle is arranged at a first angle to a cassette axis and a second position wherein said rear receptacle is arranged at a second angle to said cassette axis.

12. The system of claim 11, wherein each of said cassettes comprises a fastener for removeably securing said cassette to said tray.

13. The system of claim 11, wherein said case further comprises a pair of mounting brackets, one of said brackets attached to each of said sidewalls on either side of an outside of said case, said mounting brackets for securing said case to the rack.

14. The system of claim 11, wherein said first angle and said second angle are on either side of said cassette axis.

15. The system of claim 14, wherein said first angle and said second angle are substantially the same.

16. The system of claim 14, wherein said first angle and said second angle are between 10 degrees and 45 degrees.

17. The system of claim 11, wherein said elongate cassette housing defines a hollow cable receiving space, wherein each of said at least one third optic fiber has a length which is greater than a distance between said front face and said rear face and further wherein a loop of each of said at least one third optic fiber is arranged within said hollow cable receiving space.

18. The system of claim 17, wherein each of said loops is arranged as a serpentine.

19. The fiber optic cassette of claim 1, wherein said elongate cassette housing defines a hollow cable receiving space, wherein each of said at least one third optic fiber has a length which is greater than a distance between said front face and said rear face and wherein a loop of each of said at least one third optic fiber is arranged within said hollow cable receiving space.

20. The fiber optic cassette of claim 19, wherein each of said loops is arranged as a serpentine.

* * * * *